July 14, 1970  L. O. BENTZ  3,520,390
CLUTCH FACING
Filed Feb. 8, 1968
FIG. 1.
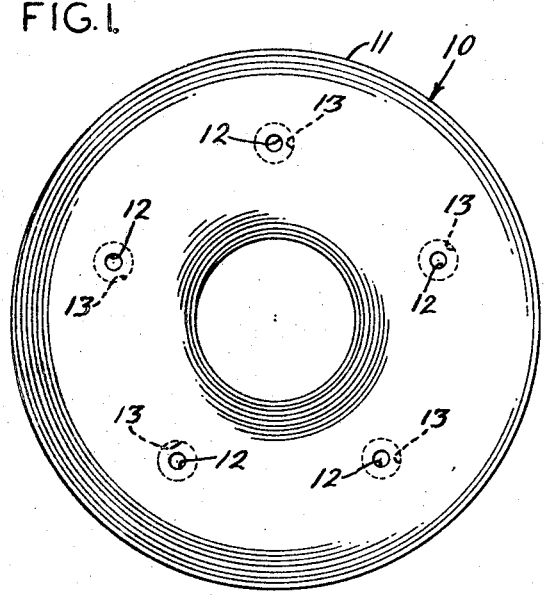
FIG. 2.
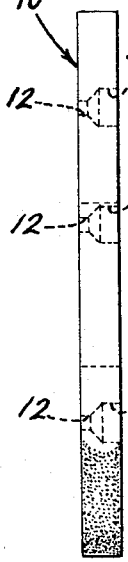
FIG. 3.
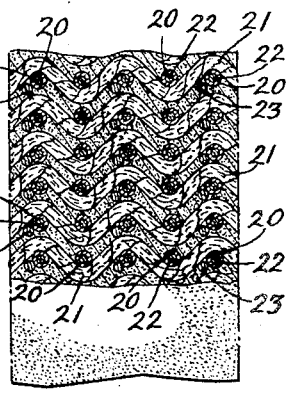
FIG. 4.
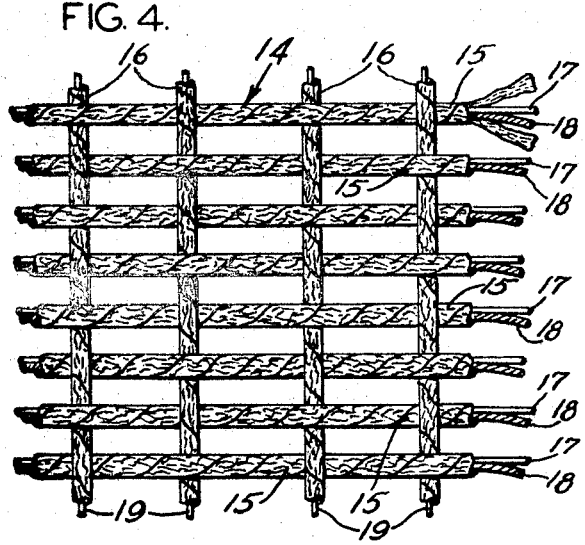
FIG. 5.
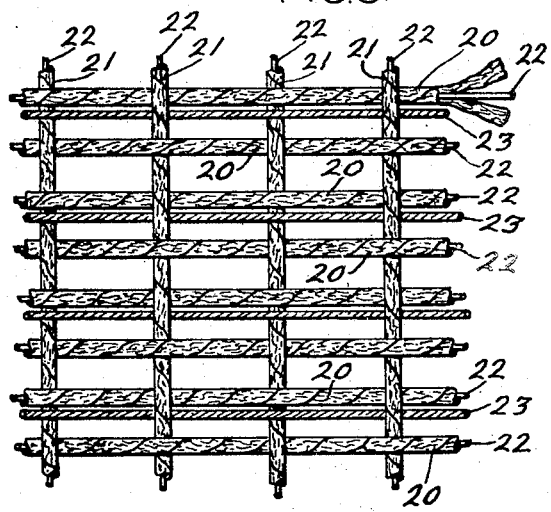
FIG. 6.
INVENTOR:
LLOYD O. BENTZ
BY Howson & Howson
ATTYS.

United States Patent Office 3,520,390
Patented July 14, 1970

3,520,390
CLUTCH FACING
Lloyd Oscar Bentz, Lancaster, Pa., assignor to Raybestos-Manhattan, Inc., Manheim, Pa., a corporation of New Jersey
Filed Feb. 8, 1968, Ser. No. 704,034
Int. Cl. F16d 11/00, 61/02
U.S. Cl. 192—107          12 Claims

ABSTRACT OF THE DISCLOSURE

A clutch facing formed of a compressed spiral coil of a fibrous fabric strip, the strip being reinforced by a plurality of spaced assemblies of substantially parallel continuous glass filaments, the assemblies running longitudinally of the fabric strip, the glass filaments of the assemblies having a surface capable of forming a strong bond with a vulcanizable elastomer, each assembly of glass filaments being impregnated with a vulcanizable elastomer, and the fabric strip being impregnated with a heat-hardenable cement composition of thermosetting resin and a vulcanizable elastomer which is vulcanizably compatible with the vulcanizable elastomer with which the assemblies of glass filaments are impregnated.

---

It has heretofore been proposed to strengthen clutch facing formed of a strip of material wound in spiral fashion against disruption by centrifugal force by bonding to one face a coextensive metal sheet or fibrous backing layer of felted or woven material. A particular disadvantage of such use of a metal sheet is high inertia, requiring greater power to rotate the clutch assembly. Other disadvantages of a metal reinforcing sheet are the difficulty of obtaining a substantially flat sheet which will meet clutch assembly dimensional tolerances, and increased costs. Although clutch facings reinforced by a fibrous backing layer, as disclosed for example in U.S. Pat. No. 2,640,795, are relatively inexpensive to produce, and have increased bursting strength, nevertheless, the increase in bursting strength provided by the backing layer may not be sufficient to cope with the very high rotative speeds clutch facings are subjected to in today's motor vehicles.

It is an object of this invention to provide novel reinforced clutch facings of the above-described type which can be produced relatively inexpensively, yet have substantially increased bursting strength.

In the drawings, FIG. 1 is a plan view of a reinforced clutch facing, in accordance with the present invention.

FIG. 2 is an end elevation of a clutch facing of this invention.

FIG. 3 is a fragmentary enlarged end elevation of the clutch facing of FIG. 2 with a part broken away to show a preferred construction.

FIG. 4 is an enlarged detail of one form of woven fabric which may be employed in the clutch facings of this invention.

FIG. 5 is an enlarged detail of another form of woven fabric which may be employed in the clutch facings of this invention.

FIG. 6 is an enlarged detail of one form of a nonwoven fabric which may be employed in the improved clutch facing of this invention.

Referring to the drawings, the reference numeral 10 indicates a clutch facing according to this invention which comprises a coiled strip 11 of a fibrous fabric, which may be woven or nonwoven as more fully described hereinafter. The several convolutions of the fabric strip 11 are bonded together by a cement composition comprising heat-hardenable resin, vulcanizable elastomer and friction material filler with which the strip is impregnated.

The clutch facings are provided with rivet holes 12 having counterbores 13, for example by drilling, for reception of attaching rivets for securing the facings to a suitable clutch plate, not shown.

The fabric strip 11, which may be woven or nonwoven, contains a plurality of assemblies of substantially parallel continuous glass filaments which extend substantially longitudinally of the fabric strip. By reason of the nature of these glass filaments and the novel manner in which they are incorporated into the fabric strip, the clutch facings of this invention have substantially improved burst strength.

As used in this specification and claims, a "filament" of glass is meant to define a substantially continuous individual fiber of glass. A "strand" on the other hand, is a collection or assembly of a great number of substantially parallel individual filaments. Thus, a strand may include from 100 up to 2000 individual filaments gathered together in a manner well known in the art and technology of glass fiber manufacture. A "yarn" is made up of a plurality of strands, e.g., ranging from 2 to 30 and even up to 50 strands, plied or assembled together continuously. Both the strands and yarn may possess a twist, reverse twist, or no twist at all.

The assemblies of glass fibers, which may be in the form of strands or yarn may be incorporated into the fabric strip in a number of different ways to achieve the advantageous results provided by this invention. FIGS. 4, 5 and 6 of the drawings illustrate different forms of fabric suitable for use as the fabric strip 11 of the novel clutch facings.

FIG. 4 ilustrates a woven fabric 14 comprised of warp yarns 15 and weft yarns 16. Each of the warp yarns 15 comprises asbestos fibers or mixtures thereof with other textile fibers such as cotton, wool, rayon, linen or jute, reinforced by a core comprising in combination fine metal wires 17 of brass, copper, zinc, lead or other metal, and a strand 18 formed of a plurality of substantially continuous parallel glass filaments of the type hereinafter described. The weft yarns 16 may have the same or a different construction than the warp yarns 15 and, in FIG. 4 are shown as formed of asbestos fibers and reinforced with fine metallic core wire 19.

The warp yarns 15 can be prepared in the twisting operation in the same manner as similar yarn with a metallic reinforcing core wire has heretofore been prepared and will present no problem to those skilled in the asbestos yarn art. The yarn 15 can then be woven into a suitable fabric, such as one having a 14 x 4 count as illustrated in FIG. 4, using the usual textile weaving processes and equipment.

The fabric illustrated in FIG. 5 comprises warp yarns 20 and weft yarns 21, both of which comprise asbestos fibers reinforced with fine metallic core wires 22. Lying closely adjacent the warp yarns and substantially parallel therewith are a plurality of ends 23 of glass yarn comprising substantially parallel continuous glass filaments. In use this woven fabric, like that of FIG. 4, is cut into strips with the warp yarns extending substantially longitudinally of the strips, and the strips are separately spirally wound to provide the clutch facings of this invention. In this way the glass yarns greatly enhance the burst strength properties of the clutch facings.

In making the fabric of FIG. 5, the glass yarn is placed on creels, in addition to the wire-reinforced asbestos warp yarn, and the two yarns are united, e.g., by twisting and pulled through the loom together. Although the fabric in FIG. 5 shows a glass yarn associated with every second asbestos warp yarn, the glass yarns may be associated with all of the asbestos warp yarns, or every third warp yarn, etc.

FIG. 6 illustrates a nonwoven fibrous fabric suitable for use in the clutch facings of this invention. The nonwoven fabric of FIG. 6 comprises a plurality of parallel extending yarns 25 each comprising asbestos fibers reinforced with a core comprising fine metallic wire 26. Lying between adjacent asbestos yarns 25 are assemblies 27 of substantially parallel continuous glass filaments 27. The yarns are held together by a suitable adhesive or cement or the type described more fully hereinafter.

The nonwoven fabric of FIG. 6 is cut into strips with the yarns running substantially longitudinal thereof, and the individual strips are spirally wound to provide separate clutch facings.

A variation of the nonwoven fabric of FIG. 6 is one formed a yarn comprising asbestos fibers reinforced with a core comprising in combination fine metallic wire and glass yarn ends of the type shown as the warp yarns 15 in the fabric illustrated in FIG. 4.

Another type of nonwoven fibrous fabric suitable for use in making the clutch facings of this invention comprises a web of dry carded spinning grade asbestos fibers reinforced by a plurality of substantially parallel glass yarns extending longitudinally of the fabric.

From the foregoing, it is readily apparent that there are many variations in fabric construction, both woven and nonwoven, within the scope of this invention. In each, the essential feature is the presence of a plurality of assemblies (yarn, strands, etc.) of substantially parallel continuous glass filaments, the assemblies extending longitudinally of the fabric.

Rather than forming the clutch facing from a single type of fabric of the above-described type, it may be formed of a spirally wound strip having two or more plies of different type fabric, at least one of which is of the glass fiber reinforced type hereinabove described.

The fabric sheet 11 is impregnated with a cement composition comprising heat-hardenable resin, vulcanizable elastomer and friction material filler.

The heat-hardenable or thermosetting resin may be the phenolic type, such as a phenol aldehyde, and especially a phenol formaldehyde resin, which, if desired, may have been rendered oil-soluble by reaction with linseed or cashew nut oil.

The vulcanizable elastomer of the cement may be natural rubber or a synthetic elastomer such as neoprene, polychloroprene, butadiene-styrene, butadiene-acrylonitrile, isoprene, the more recently developed hydrocarbon elastomers such as those comprising a copolymer of ethylene, propylene and a third monomer, such as dicyclopentadiene, which provides unsaturation for curing, and the like, and especially those elastomeric materials which are curable or vulcanizable by reaction to a set stage by peroxide or through sulfur linkages. The elastomer-containing cement, of course, will also include well known vulcanizing and stabilizing agents.

The cement composition preferably contains a conventional friction material filler. Such fillers ordinarily will comprise inorganic materials such as litharge and barytes, or an organic filler, such as particles formed of polymerized cashew nut oil.

Typical cement compositions particularly suitable for impregnating the fabric 11 of the clutch facings of this invention are as follows, the proportions given being in parts by weight:

Vulcanizable elastomer—5–15
Accelerator—.05–.5
Sulfur—1–12
Barytes—30–50
Litharge—10–40
Graphite—0.5–10
Thermosetting resin—5–25

Preferably, the cement composition will contain from about 25% to about 75% vulcanizable elastomer solids and from about 75% to about 25% of heat-hardenable resin solids, based on the combined weight of the two.

The fabric 11 may be impregnated with cement by passing the fabric through a solution of the cement in a hydrocarbon solvent and removing the excess by any suitable means, such as squeeze rolls. The fabric is then heated to a temperature at which the solvent evaporates but below that required for curing the resin and elastomer.

As stated previously, substantially improved burst strength of the clutch facings of the present invention is obtained by reason of their novel construction employing a particular type of a glass fiber or filament.

The individual filaments used in forming the strands and yarns preferably have a diameter of from about $20 \times 10^{-5}$ to about $75 \times 10^{-5}$ inches. Preferably, the filaments are approximately $35 \times 10^{-5}$ to $40 \times 10^{-5}$ inches in diameter. Also preferably the individual filaments have the properties listed in Table I, below:

TABLE I

Tensile strength (min.)—p.s.i. 500,000
Tenacity (min.)—g.p.d. 15.3
Ultimate elongation (max.)—percent 4.8
Elastic recovery (min.)—percent 100
Toughness (min.)—p.s.i. 11,900
Modulus (min.)—p.s.i. 10,500,000
Coefficient of thermal expansion (max.)—$2.8 \times 10^{-6}$
Water absorbency (max.)—percent 0.3
Moisture regain (max.)—percent 0.0

Ordinarily, the assembly of glass filaments will be in the form of one or more yarn ends, each composed of a plurality of strands. These yarn ends generally will vary in diameter from about 0.015 to about 0.025 inch, a particularly preferred size being approximately 0.020 inch. The number of yarn ends employed will depend upon the dimensions of the clutch facing. In order to obtain the necessary reinforcement, a greater number of yarn ends will be used with larger diameter facings than with smaller diameter facings. Table II below shows the burst strength that can be obtained according to this invention for clutch facings of different dimensions using differing numbers of ends of glass yarn.

In order that the glass filaments can effectively contribute reinforcing action to the clutch facing, it is desirable that the glass filaments be first treated to provide protection against interfilament destructive action and to provide the glass filaments with surfaces which are capable of forming a strong and permanent bond with a vulcanizable elatomeric material. This can be accomplished by one or more sprayed-on liquid "size" treatments just after the glass filament is formed, and a subsequent impregnation of the strands or yarns as they are formed, usually simply by introducing the gathered filaments into a part of the treating liquid while simultaneously distorting the strand filaments to effect penetration. A system of treatment for glass filaments may involve a first surface treatment embodying an anchoring agent which enhances the bonding relationship between the glass filament surface and the ultimately used elastomeric material, followed by impregnation with an elastomer.

A suitable anchoring agent is represented by the amino silanes such as gamma-aminopropyltriethoxy silane or by a similar silane having a carboxyl group in the organic group attached to the silicon atom or an amino or carboxyl group in the carboxylato group of a Werner complex compound. These may be applied to the glass filament surfaces or incorporated as a component of a size composition. The use of such silanes as anchoring agents is disclosed in U.S. Pat. No. 3,287,204 issued Nov. 22, 1966.

Another treatment to obtain enhanced bonding of an elastomer to glass filaments involves the application thereto of an aqueous solution of magnesium chloride, zinc chloride, or magnesium hydroxide or zinc hydroxide. After application is made in the form of the chloride, the solution in aqueous medium may be adjusted to an alkaline pH to effect deposition on the glass filaments in the form of the hydroxide. The hydroxides are then converted to the corresponding oxides by heat treatment. This method is described in U.S. Pat. No. 3,311,528 issued Mar. 28, 1967.

The glass filaments or fibers may also be rendered receptive to forming a strong bond with a vulcanizable elastomer by treating the glass fibers with a size having as an essential ingredient, the reaction product of an imidazoline having a long chain fatty acid group containing at least 5 carbon atoms and an unsaturated polyester resin formed in an uncured stage as disclosed in U.S. Pat. No. 3,097,963 issued July 16, 1963.

Other suitable procedures for rendering glass filaments receptive to forming a strong bond with a vulcanizable elastomer involve the use of a chromic (Werner) complex compound having a carboxylato group coordinated with a trivalent nuclear chromium atom in which the carboxylato group is of less than 6 carbon atoms and contains a highly functional group (U.S. Pat. No. 2,552,910), the use of a silane, its hydrolysis products or its polymerization products having at least one of the organic groups attached to the silicon atom containing less than 7 carbon atoms and having been formed with ethylenic unsaturation (U.S. Pat. No. 2,563,288), the use of a silane-organic polymeric compound having film forming properties (U.S. Pat. No. 3,169,884), and the use of a size consisting of an organo silicon compound in the form of a silane, a water dispersible polyvinyl pyrrolidine, gelatin, and a water dispersible polyester resin (U.S. Pat. No. 3,207,623).

This invention is not limited to any specific treatment of the glass filaments, provided the treatment provides the glass filament surfaces with the ability to form a strong bond with a vulcanizable elastomer.

After treatment of the glass fibers with an anchoring agent for an elastomer, such as one of those described hereinabove, preferably the bundle of glass fibers is impregnated with a vulcanizable elastomer which is vulcanizably compatible with the vulcanizable elastomer used to impregnate the fabric strip. For this purpose, the strand or yarn of glass fibers is simply unwound from a supply drum and advanced submergedly into a bath of the elastomeric impregnant. Thence, the impregnated yarn is pulled through a wiping die which works the impregnating liquid into the interior regions of the bundle or strand and also serves to wipe off excess material.

The glass fiber strands may be impregnated with the same vulcanizable elastomer as used in the fabric cement or a different one, provided the respective elastomers are vulcanizably compatible and bond together.

The impregnated fabric which may be 40 inches or more in width, may be tightly wound on a mandrel. The diameter of the mandrel and the amount of cloth wound thereon are determined by the I.D. and O.D. of the clutch facings desired. The fabric is then cut into discs of the desired width, e.g., ½ inch, and the discs are removed from the mandrel and consolidated under heat and pressure as hereinafter described. FIG. 3 is an enlarged end elevation of a clutch facing made in this manner from the fabric of FIG. 5, with a part broken away to show the construction.

Alternately, the fabric can be cut into strips so that the glass yarn ends run longitudinally of the strips. The individual strips can then be spirally wound to form the clutch facings. If desired, the fabric can be shaped or folded longitudinally to impart to it an arcuate, V-shape, or other deformed cross section. This can be done prior to or simultaneously with forming the fabric strip into a spiral coil. Suitable apparatus for folding the fabric strip longitudinally while simultaneously winding the strip is disclosed in U.S. Pat. No. 2,096,692.

After the fabric strip has been wound spirally to form an annular body, the body is compressed and consolidated under heat and pressure. For example, the annular body can be subjected to a pressure of the order of 5000 p.s.i. at 320° F. for a period of a few minutes to effect densification and partial cure of the fabric cement. Subsequently the body can be heated at about 400° F. for a period of several hours to convert the thermosetting resin of the fabric cement to the substantially infusible insoluble state, and to vulcanize the elastomers in the cement and glass fibers.

Subsequently, the resulting clutch facing may be subjected to a finishing operation, as for example surface grinding to the desired dimensions. The rivet holes 12 may be formed during the molding operation or formed subsequently by drilling and counterboring.

The following specific examples are given to further describe the advantages of this invention.

The clutch facings produced according to the following examples were tested for burst strength using the following procedure. Burst strength data are recorded in Table II.

Each clutch facing was riveted to the driven member making certain the rivets were properly tightened. The mounted clutch facing was then heated for 15 minutes in a circulating air oven maintained at 500° F. The mounted clutch facing was removed from the oven and promptly (within 15 seconds) mounted on the shaft of a Centrifugal Burst Machine. The test was immediately begun and the driven member to which the test clutch facing was mounted reached 3500 r.p.m. in approximately 2 seconds. Thereafter the speed of rotation of the driven member was increased at an average rate of approximately 135 r.p.m./sec. until the clutch facing burst, at which time the speed of rotation was recorded.

EXAMPLE I

A cloth 40" wide and having a 14 x 4 count was woven using as warp and weft yarn an asbestos fiber yarn having as a core a fine brass wire, approximately 0.008" in diameter. This cloth was impregnated in a vertical tower with approximately 55 percent, by weight (solvent-free basis) of the following heat curable cement composition dissolved in hydrocarbon solvent:

| Constituent: | Parts by weight |
| --- | --- |
| Butadiene-styrene rubber | 9.0 |
| Phenol aldehyde resin | 17.0 |
| Litharge | 27.0 |
| Graphite | 2.0 |
| Barytes | 36.0 |
| Accelerator | 0.3 |
| Sulfur | 6.7 |
| Plasticizers | 2.0 |
| | 100.0 |

The dried cloth was wound on a mandrel having a diameter of approximately 6½" to form an annular roll approximately 11" in outer diameter. The roll was then cut into annular discs approximately 0.135" thick.

The several discs were placed in heated molds and subjected to a pressure of 5000 p.s.i. at 320° F. for 3 minutes and 30 seconds to effect densification and partial cure of the cement. Subsequently the discs were further heated at 400° F. for 5 hours to convert the thermosetting phenolic resin to the infusible insoluble state and to vulcanize the elastomers.

The resulting clutch facings were ground to the following dimensions: O.D. 11"; I.D. 6.5"; thickness 0.135".

The several clutch facings were tested for burst strength using the above-described procedure. The results are set forth in Table II, below.

EXAMPLE II

Clutch facings having the same dimensions as those of Example I were fabricated by the procedure described in that example, but using a cloth 40" wide having a 14 x 4 count and having as the warp yarn an asbestos fiber yarn having as a core a fine brass wire, approximately 0.008" in diameter and a glass yarn approximately 0.02" in diameter and comprised of five strands twisted together to provide two and one half turns per inch. Each strand comprised approximately 400 continuous glass filaments, each having a diameter of approximately $38 \times 10^{-5}$ inches. The surfaces of the filaments had been chemically treated to render them capable of forming a strong bond with rubber, and the strands were impregnated with a butadiene-styrene rubber. The weft yarn comprised an asbestos yarn reinforced with brass wires.

Burst strength data for these clutch facings are set forth in Table II, below.

EXAMPLE III

Clutch facings having the same dimensions as those of Example I were fabricated by the procedure described in that example, but using a cloth having a 14 x 4 count and having as the warp yarn an asbestos fiber yarn having as a core of fine brass wire, approximately 0.008" in diameter. Closely adjacent to and substantially parallel with every second warp yarn was a glass yarn which had been introduced into the cloth at the loom. The glass yarn was the same as that described in Example II.

Burst strength data for these clutch facings are set forth in Table II, below.

EXAMPLE IV

Clutch facings similar to those described in Example III were made as therein described from the same type of asbestos cloth with the exception that there was a glass yarn closely adjacent to and substantially parallel with each warp yarn. The glass yarn was the same as that described in detail in Example II.

Burst strength for these clutch facings are set forth in Table II, below.

EXAMPLE V

Clutch facings having an O.D. of 12⅞", an I.D. of 7¼" and a thickness of 0.15" and having the construction of those of Example I were prepared as described in that example and tested for burst strength following the above-described procedure. Burst strength data for these clutch facings are set forth in Table II, below.

EXAMPLE VI

Clutch facings having an O.D. of 12⅞", an I.D. of 7¼" and a thickness of 0.15" and having the construction of those of Example II were prepared as described in that example and tested for burst strength following the above-described procedure. Burst strength data for these clutch facings are set forth in Table II, below.

EXAMPLE VII

Clutch facings having an O.D. of 12⅞", an I.D. of 7¼" and a thickness of 0.15" and having the construction of those of Example III were prepared as described in that example and tested for burst strength following the above-described procedure. Burst strength data for these clutch facings are set forth in Table II, below.

EXAMPLE VIII

Clutch facings having an O.D. of 12⅞", an I.D. of 7¼" and a thickness of 0.15" and having the construction of those of Example IV were prepared as described in that example and tested for burst strength following the above-described procedure. Burst strength data for these clutch facings are set forth in Table II, below.

TABLE II

| Example | Dimensions (inches) | Burst strength (r.p.m.) Minimum | Maximum |
|---|---|---|---|
| I | 11 x 6½ x 0.135 | 8,910 | 9,020 |
| II | 11 x 6½ x 0.135 | 9,900 | 9,900 |
| III | 11 x 6½ x 0.135 | 10,450 | 10,670 |
| IV | 11 x 6½ x 0.135 | 10,450 | 10,560 |
| V | 12⅞ x 7¼ x 0.150 | 6,700 | 7,590 |
| VI | 12⅞ x 7¼ x 0.150 | 8,030 | 8,910 |
| VII | 12⅞ x 7¼ x 0.150 | 8,140 | 9,350 |
| VIII | 12⅞ x 7¼ x 0.150 | 10,230 | 10,450 |

Referring to Table I above, it can be seen that substantially increased burst strength is provided by the clutch facings of this invention as compared to the prior known structure of the control clutch facings (compare Examples II, III and IV with Example I, and Examples VI, VII and VIII with Example V).

It will be understood that various changes may be made in the details of construction, arrangement and in the processing steps for the manufacture, without departing from the spirit of the invention, especially defined in the following claims.

What is claimed is:

1. A friction element comprising an annular body formed of a spirally wound fibrous fabric strip comprising asbestos fibers impregnated with a heat-curable cement composition comprising a thermosetting resin and a vulcanizable elastomer, said fabric containing a plurality of spaced assemblies of substantially parallel continuous glass filaments extending substantially longitudinally of said fabric strip, the surfaces of said glass filaments having been treated with an anchoring agent for improving the bond between said surfaces of said glass filaments and a vulcanizable elastomeric material, and said assemblies of glass filaments having been impregnated with a vulcanizable elastomer which is vulcanizably compatible with said vulcanizable elastomer in said fabric cement, said spirally wound strip being compressed to consolidate the convolutions upon each other, and heat treated to cure said cement, whereby said thermosetting resin is converted to the infusible, insoluble state and said elastomers are vulcanized.

2. A friction element according to claim 1 in which said assembly of glass fibers comprises yarn formed of substantially continuous parallel glass filaments having a diameter from about $20 \times 10^{-5}$ to about $75 \times 10^{-5}$ inches.

3. A friction element according to claim 1 in which said fabric strip comprises a plurality of substantially parallel yarns comprising textile fibers having a core comprising in combination metallic wire and said assembly of glass filaments.

4. A friction element comprising an annular body formed of a spirally wound woven fibrous fabric strip comprising asbestos fibers and having warp yarns extending substantially longitudinally of said strip and comprising an assembly of substantially parallel continuous glass filaments the surfaces of which have been treated with an anchoring agent for improving the bond between said surfaces of said glass filaments and a vulcanizable elastomeric material, each of said assemblies of glass being impregnated with a vulcanizable elastomer, said fabric strip being impregnated with a heat-curable cement comprising a thermosetting resin and a vulcanizable elastomer which is vulcanizably compatible with said vulcanizable elastomer with which said assemblies of glass filaments are impregnated, said spirally wound strip being compressed to consolidate the convolutions upon each other, and heat treated to cure said cement, whereby said thermosetting resin is converted to the infusible, insoluble state and said elastomers are vulcanized.

5. A friction element according to claim 4 in which said warp yarns comprise asbestos fibers having a core comprising said asembly of substantially continuous parallel glass filaments.

6. A friction element according to claim 4 in which said glass filaments have a diameter of from about $20 \times 10^{-5}$ to about $75 \times 10^{-5}$ inches.

7. A friction element according to claim 4 in which at least some of said warp yarns comprise asbestos fibers having a core comprising in combination metallic wire and said assembly of substantially continuous parallel glass filaments.

8. A friction element according to claim 7 in which said fabric cement comprises an oil soluble phenol aldehyde resin and a vulcanizable elastomer comprising butadiene and styrene.

9. A friction element comprising an annular body formed of a spirally wound woven fibrous fabric strip having warp yarns extending substantially longitudinally of said strip and comprising asbestos fibers reinforced by a metallic wire core, said fabric containing a plurality of assemblies of substantially parallel continuous glass filaments extending in substantially parallel side-by-side relation to at least some of said warp yarns, the surfaces of said glass filaments having been treated with an anchoring agent for improving the bond between said surfaces of said glass filaments and a vulcanizable elastomeric material, and said assemblies of glass filaments being impregnated with a vulcanizable elastomer, said fabric strip being impregnated with a heat-curable cement comprising a thermosetting resin and a vulcanizable elastomer which is vulcanizably compatible with said vulcanizable elastomer with which said assemblies of glass filaments are impregnated, said spirally wound strip being compressed to consolidate the convolutions upon each other, and heat treated to cure said cement, whereby said thermosetting resin is converted to the infusible, insoluble state and said elastomers are vulcanized.

10. A friction element according to claim 9 in which said glass filaments have a diameter of from about $20 \times 10^{-5}$ to about $75 \times 10^{-5}$ inches.

11. A friction element according to claim 9 in which said warp yarns comprise asbestos fibers reinforced by a metallic wire core.

12. A friction element according to claim 9 in which said assemblies of glass filaments comprise a yarn having a diameter of from about 0.015 to about 0.025 inch.

References Cited

UNITED STATES PATENTS

| | | | |
|---|---|---|---|
| 3,287,204 | 11/1966 | Marzocchi | 161—175 |
| 2,052,808 | 9/1936 | Spokes | 192—107 XR |
| 2,096,692 | 10/1937 | Cilley | 192—107 |
| 2,175,399 | 10/1939 | Judd | 192—107 XR |
| 2,428,298 | 9/1947 | Spokes et al. | 188—251 XR |
| 2,546,056 | 3/1951 | Batchelor | 192—107 XR |
| 2,555,260 | 5/1951 | Walters | 192—107 XR |
| 2,640,795 | 6/1953 | Bertolet | 192—107 XR |
| 2,702,770 | 2/1955 | Steck | 192—107 XR |
| 3,068,131 | 12/1962 | Morton. | |
| 3,365,041 | 1/1968 | Stormfelt. | |

FOREIGN PATENTS 854,005   12/1938   France.

MARTIN P. SCHWADRON, Primary Examiner

L. J. PAYNE, Assistant Examiner

U.S. Cl. X.R.

161—175; 188—251, 259